United States Patent [19]

Sakaguchi et al.

[11] Patent Number: 4,490,020
[45] Date of Patent: Dec. 25, 1984

[54] COUPLING SYSTEM FOR OUTPUT LIGHT OF SEMICONDUCTOR LASER

[75] Inventors: Haruo Sakaguchi, Tanashi; Norio Seki, Kamiuma; Shu Yamamoto, Chofu, all of Japan

[73] Assignee: Kokusai Denshin Denwa Kabushiki Kaisha, Tokyo, Japan

[21] Appl. No.: 267,554

[22] Filed: May 27, 1981

[30] Foreign Application Priority Data

Jun. 11, 1980 [JP] Japan ................................ 55/77877

[51] Int. Cl.³ ............................................. G02B 5/172
[52] U.S. Cl. ................................................ 350/96.18
[58] Field of Search .............. 350/96.15, 96.17, 96.18, 350/96.20; 250/227; 357/19

[56] References Cited

U.S. PATENT DOCUMENTS

| | | | |
|---|---|---|---|
| 3,897,135 | 7/1975 | Dyott | 350/96.15 |
| 4,108,622 | 8/1978 | Martin | 350/96.18 |
| 4,143,940 | 3/1979 | Khoe | 350/96.15 |
| 4,270,134 | 5/1981 | Takeda et al. | 357/19 |
| 4,327,963 | 5/1982 | Khoe et al. | 350/96.18 |
| 4,370,021 | 1/1983 | Khoe et al. | 350/96.18 |

FOREIGN PATENT DOCUMENTS 2805358 8/1979 Fed. Rep. of Germany ... 350/96.15

OTHER PUBLICATIONS

Kuwahara et al., *Sixth European Conference on Optical Communication,* Sep. 16-19, 1980, University of York, U.K., "Efficient and Reflection Insensitive Coupling . . . ", pp. 191-194.

Dakss, *Laser Focus,* Dec. 1975, "Coupling Light Sources to Fibers", pp. 31-34.

Kuwahara et al., *Proceedings of the IEEE,* vol. 67, No. 10, Oct. 1979, "Efficient Light Coupling from Semiconductor Lasers . . . ", pp. 1456-1457.

*Primary Examiner*—William L. Sikes
*Assistant Examiner*—Frank González
*Attorney, Agent, or Firm*—Robert E. Burns; Emmanuel J. Lobato; Bruce L. Adams

[57] ABSTRACT

A coupling system for the output light of a semiconductor laser, characterized in that an end portion of an optical fiber is made as a focusing lens to be coupled with the output light from an active layer of the semiconductor laser is formed so that, at least in a plane parallel to the optical axis of the output light and perpendicular to the junction plane of the semiconductor laser, the width of the end portion continuously decreases towards its tip to provide a required curvature at the tip and that the distribution of light of the semiconductor laser and that of the optical fiber and the focusing lens are matched with each other in the plane perpendicular to the junction plane of the semiconductor laser. The end portion of the optical fiber defining the focusing lens may be formed to have a fixed width in a plane parallel to the junction plane of the semiconductor laser. The end portion of the optical fiber or focusing lens may be formed so that it has a required curvature in a plane parallel to the plane of junction of the semiconductor laser and that the distribution of light of the semiconductor laser and that of the optical fiber and focusing lens are matched with each other also in a plane parallel to the junction plane of the semiconductor laser.

1 Claim, 20 Drawing Figures

COUPLING SYSTEM FOR OUTPUT LIGHT OF SEMICONDUCTOR LASER

BACKGROUND OF THE INVENTION

The present invention relates to a light coupling system, and more particularly, to a system for coupling the output light of a semiconductor laser to an optical fiber of a focusing lens.

Light coupling systems of prior art have defects, such as difficult fabrication and low reliability of the mechanical strength, etc., as mentioned below.

BRIEF SUMMARY OF THE INVENTION

An object of the present invention is to provide a coupling system which is free from the abovesaid defects of the prior art and permits efficient coupling of the output light of a semiconductor laser to an optical fiber.

To attain the above object of this invention, there is provided a coupling system for the output light of a semiconductor laser, characterized in that an end portion of an optical fiber or focusing lens to be coupled with the output light from an active layer of the semiconductor laser is formed so that, at least in a plane parallel to the optical axis of the output light and perpendicular to the junction plane of the semiconductor laser, the width of the end portion continuously decreases towards its tip to provide a required curvature at the tip portion and that the distribution of light of the semiconductor laser and that of the optical fiber or the focusing lens are matched with each other in the plane perpendicular to the junction plane of the semiconductor laser. The end portion of the optical fiber or focusing lens may be formed to have a fixed width in a plane parallel to the junction plane of the semiconductor laser. The end portion of the optical fiber or focusing lens may be formed so that it has a required curvature in a plane parallel to the plane of junction of the semiconductor laser and that the distribution of light of the semiconductor laser and that of the optical fiber or focusing lens are matched with each other also in a plane parallel to the junction plane of the semiconductor laser.

BRIEF DESCRIPTION OF THE DRAWINGS

The invention will be hereinafter described in detail in comparison with the prior art with reference to the accompanying drawings; in which.

DETAILED DESCRIPTION

To make differences between the prior art and the present invention clear, examples of the prior art will first be described.

Figure 1A:
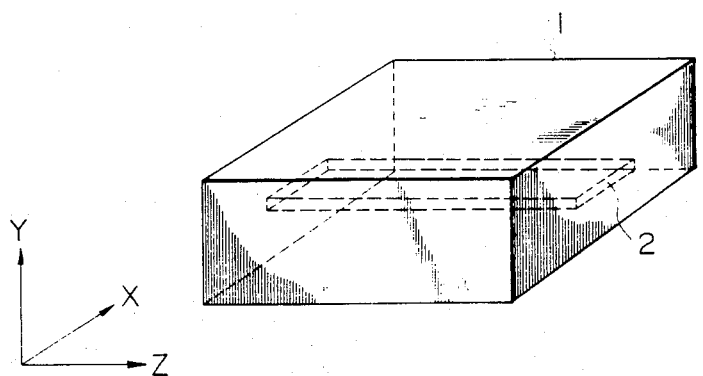
FIG. 1A is a perspective view of a semiconductor laser to which the present invention is applied.
Figure 1B:
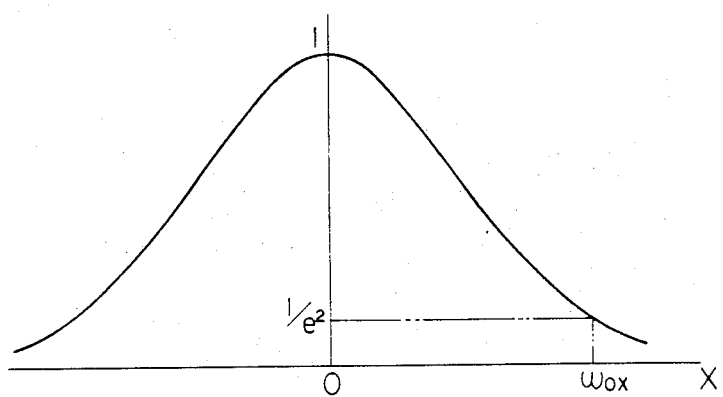
FIGS. 1B and 1C are graphs showing normalized light intensity distributions in X- and Y-directions in an active layer of the semiconductor laser depicted in FIG. 1A.
Figure 1C:
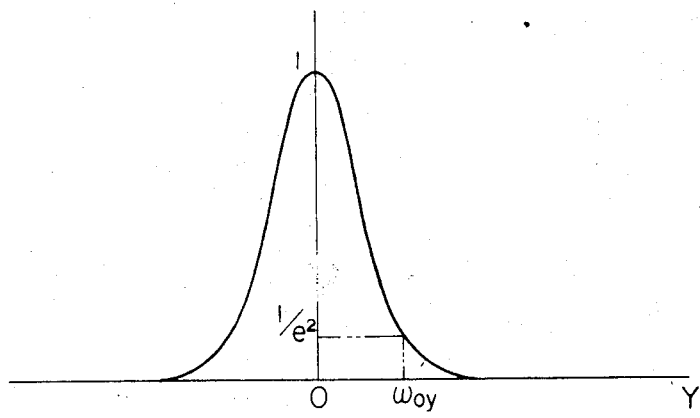

With reference to FIG. 1A showing a perspective view of a semiconductor laser to which the present invention is applied, the light emitting portion of a semiconductor 1 is mainly limited to the inside of an active layer 2. FIGS. 1B and 1C are graphs qualitatively showing examples of normalized light intensity distributions in the light emitting portion in the X- and Y-directions, respectively. In FIGS. 1B and 1C, $\omega_{ox}$ and $\omega_{oy}$ are each a distance over which the light intensity decreases to $1/e^2$ of the intensity at the center of the light emitting portion; this distance is commonly referred to as a spot size. The typical values of $\omega_{ox}$ and $\omega_{oy}$ in a planar-stripe semiconductor laser emitting in the 1 μm wavelength region are about 5 and 0.5 μm, respectively.

Figure 2:
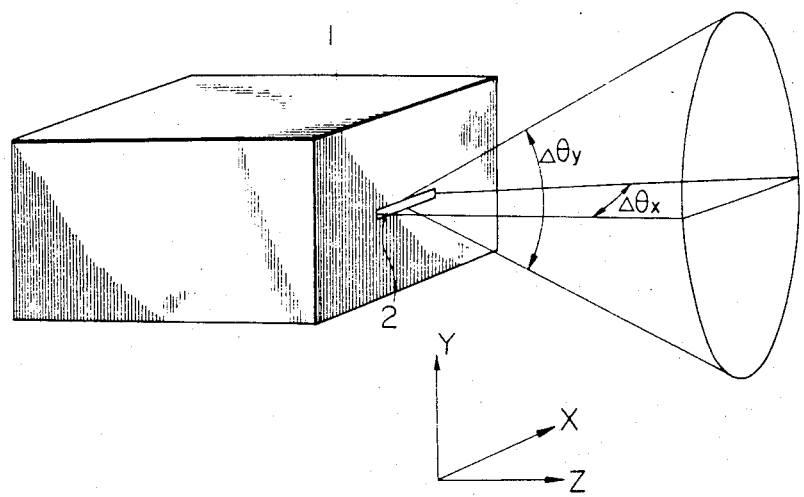
FIG. 2 is a perspective view showing how the output light of the semiconductor laser, to which the present invention is applied, spreads in space.

FIG. 2 qualitatively shows how the output light of the semiconductor laser spreads in space. In this case, expansion angles $\Delta\theta_x$ and $\Delta\theta_y$ of the output light in the X-axis and the Y-axis direction are approximately given by the following equation (1):

$$\Delta\theta_{x,y} = 2\lambda/\pi\omega_{ox,y} \text{ (radian)} \quad (1)$$

where $\lambda$ is wavelength and $\pi$ is the circle ratio. In ordinary semiconductor lasers, since the spot sizes $\omega_{ox}$ and $\omega_{oy}$ in the X- and Y-directions largely differ from each other, the output light emitted from the active layer 2 of the semiconductor laser 1 spreads in such an elliptical form as shown in FIG. 2.

Figure 3:
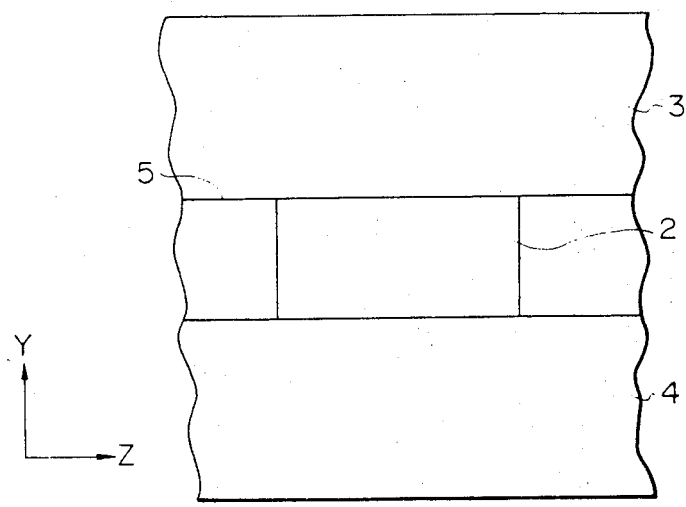
FIG. 3 is a sectional view showing the light emitting portion and the surrounding portion of the semiconductor laser in a plane perpendicular to the optical axis.

FIG. 3 is a sectional view showing the light emitting portion and the surrounding portion of the semiconductor laser in the X-Y plane perpendicular to the optical axis. The active layer 2 is surrounded by layers 3 and 4 of smaller refractive indices than that of the active layer 2 and a current flowing in a direction along the Y-axis is narrowed, by which the light emitting portion is restricted to the inside of the active layer 2. Between the layers 2 and 3 or between 2 and 4 is formed a pn junction plane to define the direction of flow of the current. In FIG. 3, a junction plane 5 is shown to be formed between the layers 2 and 3.

Figure 4A:
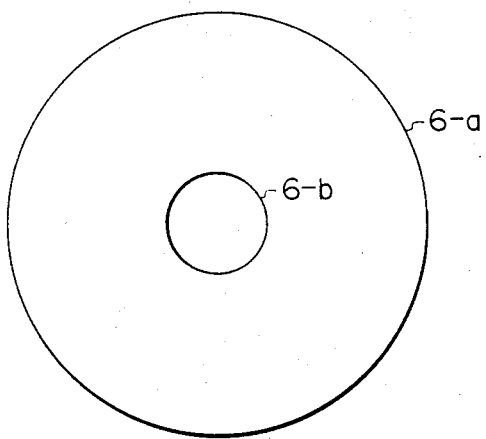
FIG. 4A is a cross-sectional view of an optical fiber to which the present invention is applied.
Figure 4B:
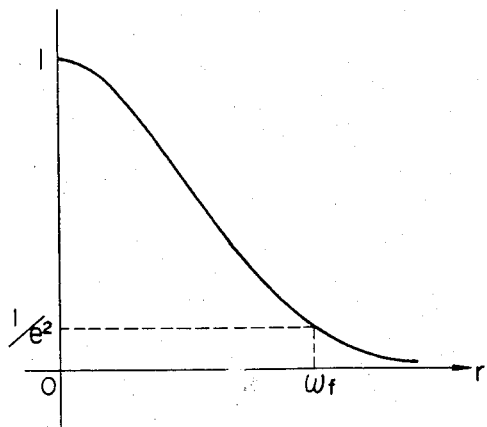
FIG. 4B is a graph showing the normalized light intensity distribution in the cross section of the optical fiber.

FIG. 4A shows the section of a fiber to which the output light of the semiconductor laser is to be coupled. In FIG. 4A, reference numeral 6a indicates a fiber and 6b designates a core. FIG. 4B shows, in connection with a case of a single mode fiber, the normarized light intensity distribution of the propagation mode in the core of the fiber. In FIG. 4B, reference character $\omega_f$ identifies the radius within which the light intensity in the propagation mode is reduced down to $1/e^2$ of the light intensity at the center of the fiber, the radius being referred to as the mode radius. The value of $\omega_f$ in a case of light of the 1 μm band being propagated is usually about 5 to 6 μm.

In this case, the coupling ratio $\eta$ in which the output light from the semiconductor laser is coupled to the single mode fiber is given by the following equation (2):

$$\eta = \eta_x \cdot \eta_y \quad (2)$$

where, $$\eta_x = \frac{2}{(\omega_{ox}/\omega_f) + (\omega_f/\omega_{ox})}, \quad (2)$$

$$\eta_y = \frac{2}{(\omega_{oy}/\omega_f) + (\omega_f/\omega_{oy})}$$

In the equation (2), $\eta_x$ and $\eta_y$ respectively indicate the coupling efficiencies between the X- and Y-direction light components of the semiconductor laser and the mode of the fiber. In the equation (2), it is assumed that the distance between the semiconductor laser and the fiber is zero and that no positional and angular deviations exist between them and further, a reflection loss (usually 4% or so) is also neglected.

Assuming that $\omega_f = 5$ μm, that $\omega_{ox} = 5$ μm, and that $\omega_{oy} = 0.5$ μm, $\eta_x = 1.0$, $\eta_y = 0.198$ and $\eta = 0.198$ are obtained. As is evident from this result, the coupling efficiency is mainly determined by a difference between the distribution of the light component in the Y-direction of the semiconductor laser and the light distribution in the propagation mode of the fiber, and a wider difference between the two distributions results in the coupling efficiency becoming more impaired.

Figure 5:
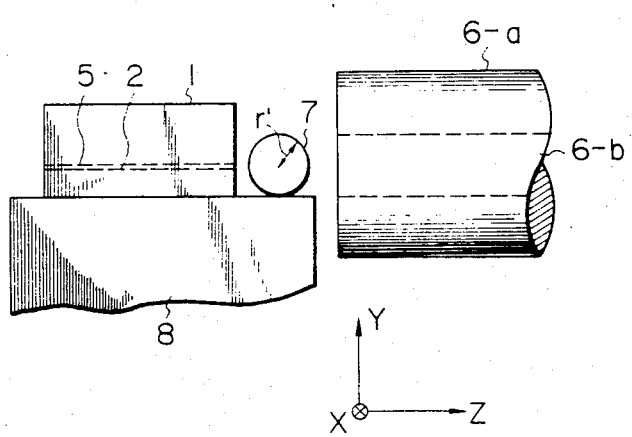
FIG. 5 is a side view showing an example of a conventional system for coupling a semiconductor laser with an optical fiber through the use of a cylindrical lens.

To avoid such a defect, it is general practice in the prior art to employ such an arrangement as depicted in FIG. 5, in which a cylindrical lens 7 is disposed on a substrate 8 along the X-axis in the plane parallel to the junction plane 5 of the active layer 2 of the semiconductor laser 1 so that the light component in the Y-direction from the active layer 2 of the semiconductor laser 1 may be converged by the cylindrical lens 7 for efficient incidence on the core 6b of the fiber 6a. Letting the radius and refractive index of the cylindrical lens 7 be represented by r' and n, respectively, its focal distance f can be expressed by $f = nr'/2(n-1)$. By a suitable selection of the radius r', it is possible to match the light component of the laser 1 in the Y-direction with the propagation mode of the fiber.

By the way, the diameter of the cylindrical lens 7 is usually as small as 10 μm or so; this poses problems in terms of manufacturing and reliability of mechanical strength and, further, introduces great difficulties in the attachment of the lens to the substrate 8 or the end face of the fiber 6a. In addition, since the input end face of the optical fiber 6a is flat, a portion of the semiconductor laser light is reflected by the end face of the fiber 6a back into the active layer 2 of the semiconductor laser 1. This develops a defect such that the operation of the semiconductor laser becomes unstable.

Figure 6A:
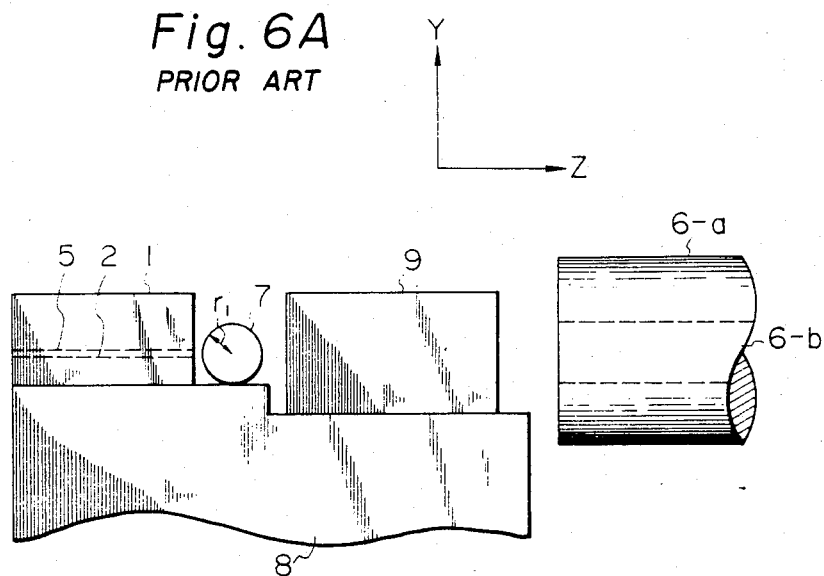
FIGS. 6A and 6B are a side view and a plan view showing another example of the conventional system for coupling the semiconductor laser with the optical fiber through the use of a cylindrical lens and an axially symmetric lens.
Figure 6B:
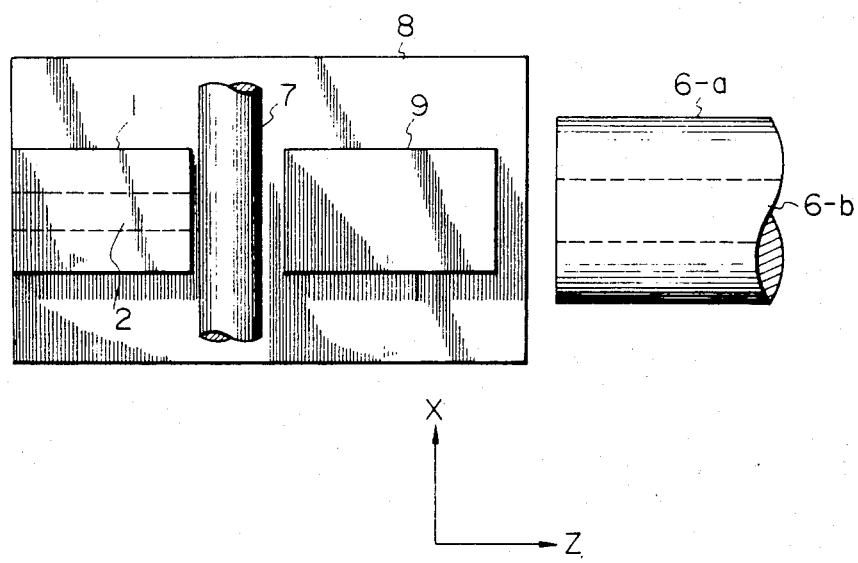

The coupling system shown in FIG. 5 markedly improves the coupling efficiency in the Y-direction perpendicular to the junction plane 5 of the active layer of the semiconductor laser. Further, such a coupling system as depicted in FIG. 6 has been proposed for raising the coupling efficiency in the X-direction parallel to the junction plane of the active layer of the semiconductor laser. FIGS. 6A and 6B are diagrams viewed from directions perpendicular and parallel to the junction plane 5 of the semiconductor laser, respectively. In a case of the light of such an elliptical spot as depicted in FIG. 2, emitted from the active layer 2 of the semiconductor laser 1, the Y-direction light component perpendicular to the junction plane 5 is converged by the cylindrical lens 7 and the X-direction light component parallel to the junction plane 5 passes through the cylindrical lens 7; as a result of this, the emitted light appears in the form of a circular light beam at the output side of the cylindrical lens 7. In FIG. 6, reference numeral 9 indicates an axially symmetric lens, which has a function of matching the circular light beam from the cylindrical lens 7 and the propagation mode of the core 6b of the optical fiber 6a and which is formed, for example, by a biconvex lens or a lens the refractive index of which has a square distribution. As a result of this, not only the Y-direction light component but also the X-direction light component of the semiconductor laser can be efficiently coupled to the fiber. Also in this system, however, there are presented the problems of difficult fabrication and low reliability of the mechanical strength of the cylindrical lens 7 due to its small diameter and the problem of reflection of light by the fiber 6a back to the semiconductor laser 1, as is the case with the system described above in conjunction with FIG. 5.

The present invention will hereinafter be described in detail.

Figure 7A:
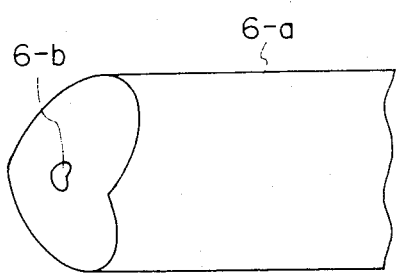
FIGS. 7A, 7B and 7C are a perspective view of the optical fiber in an embodiment of the present invention, a longitudinal view of the fiber in the X-Z plane and a longitudinal sectional view of the fiber in the Y-Z plane.
Figure 7B:
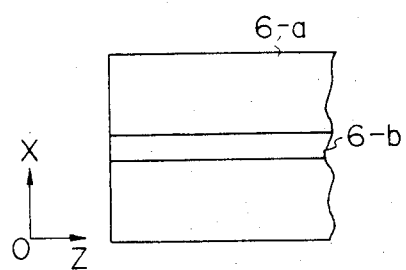
Figure 7C:
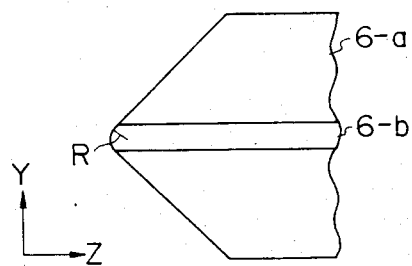

FIG. 7 shows a light-receiving end portion of a fiber formed according to the present invention with a view to improve the coupling efficiency of the light component perpendicular to the junction plane of the semiconductor laser. FIG. 7A is a perspective view of the end portion of the fiber; FIG. 7B is a longitudinal sectional view in a plane parallel to the X-Z plane and passing through the center axis of the fiber; and FIG. 7C is a longitudinal sectional view in a plane parallel to the Y-Z plane and passing through the fiber center axis. As depicted in FIGS. 7A to 7C, the light-receiving end portion of the fiber is formed in such a manner that its thickness in the Y-Z plane continuously diminishes towards the fiber tip to provide the end portion with a required radius of curvature R and that the thickness in the X-Z plane is fixed; namely, the light-receiving end portion of the fiber 6a is formed as if it had a hemi-cylindrical lens formed as a unitary structure therewith. Such a fiber end portion can be easily obtained by polishing one end portion of a fiber into a wedge-like shape and then subjecting it to the chemical etching or heat-fusion technique. Further, in accordance with the present invention, since the portion of the radius of curvature R, which corresponds to a hemi-cylindrical lens for matching use, is formed as a unitary structure with the fiber, the problem of the mechanical strength arising from the small diameter of the lens is solved and no lens need be installed on the mount.

Figure 8:
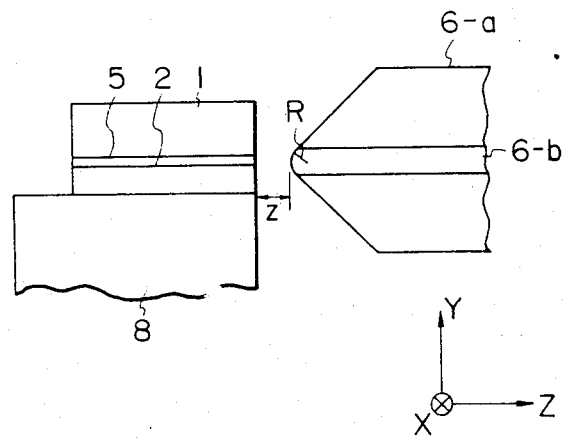
FIG. 8 is a longitudinal sectional view illustrating another embodiment of the present invention.

FIG. 8 illustrates an embodiment of the semiconductor laser-fiber coupling system of the present invention in the Y-Z plane passing through the fiber center axis. The Y-direction light component in the active layer 2 of the semiconductor laser 1 mounted on the substrate 8 is enlarged by the curved portion at the tip of the fiber 6 and matched with the light distribution of the propagation mode of the core 6b, allowing a highly efficient coupling. By selecting the radius of curvature R at the tip of the fiber as given by the following equation (3), the Y-direction light component of the semiconductor laser and the light distribution of the propagation mode of the fiber can be matched with each other.

$$R = (n'-1) \cdot R_y \quad (3)$$

where $R_y$ is given by the following equation (4):
$$R_y = \{4z^2 + (k\omega_{oy}^2)^2\}/4z \quad (4)$$

where n' is the refractive index of the fiber core, z is a distance between the semiconductor laser and the fiber tip and k ($=2\pi/\lambda$, $\lambda$ being wavelength) is the wave number.

In this case, the coupling efficiency $\eta$ is given by the following equation (5):

$$\eta = \frac{4}{\omega_f^2 \omega_x \omega_y \sqrt{\left(\frac{1}{\omega_x^2} + \frac{1}{\omega_f^2}\right)^2 + \left(\frac{k}{2R_x}\right)^2 \left(\frac{1}{\omega_y^2} + \frac{1}{\omega_f^2}\right)}} \quad (5)$$

where $$R_x = [4z^2 + (k\omega_{ox}^2)^2]/4z \quad (6)$$

$$\omega_x = \sqrt{4z^2 + (k\omega_{oy}^2)^2}/(k\omega_{ox}) \quad (7)$$

$$\omega_x = 4z^2 + (k\omega_{ox}^2)^2/(k\omega_{ox}) \quad (8)$$

where $\omega_{x,y}$ represent spot sizes of the X and Y components of the laser output beam at a position spaced a distance z apart from the end face of the semiconductor laser and $R_{x,y}$ represent curvatures of the phase fronts of the X and Y components of the laser output beam at the position z. In connection with a case of using a semiconductor laser having parameters such as $\omega_{ox} = 0.24$ $\mu$m, $\omega_{oy} = 0.51$ $\mu$m and $\lambda = 1.32$ $\mu$m and a single mode fiber having a mode radius $\omega_f = 6.56$ $\mu$m, FIG. 9 shows the relationships of the curvature radius R and the coupling efficiency $\eta$ to the distance z between the semiconductor laser and the fiber tip which are obtained from the equations (3) and (5).

Figure 9:
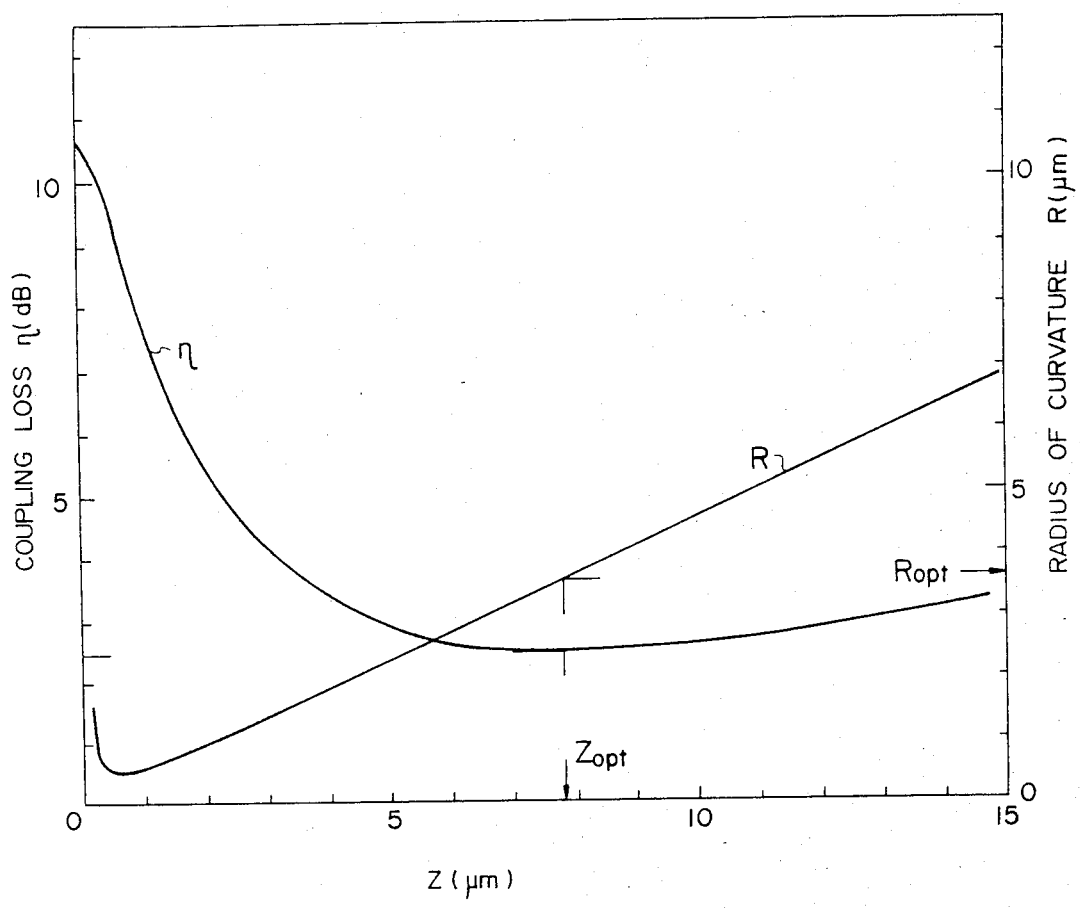
FIG. 9 is a graph showing the relationships between the radius of curvature of the lens portion and coupling loss in the above embodiment.

In FIG. 9, the coupling efficiency $\eta$ is represented in terms of coupling loss in dB. It appears from FIG. 9 that there exists $Z_{opt}$ which minimizes the coupling loss and that an optimum value $R_{opt}$ of the radius of curvature is determined in correspondence to this $Z_{opt}$.

In accordance with the present invention, the curved portion for optical matching is formed of the fiber itself, so that there is no discontinuity of the refractive index between the lens and the fiber unlike in the prior art examples; this markedly improves the unstableness of the semiconductor laser operating characteristics which is caused by the reflection of light back into the active layer 2 of the semiconductor laser.

Figure 10A:
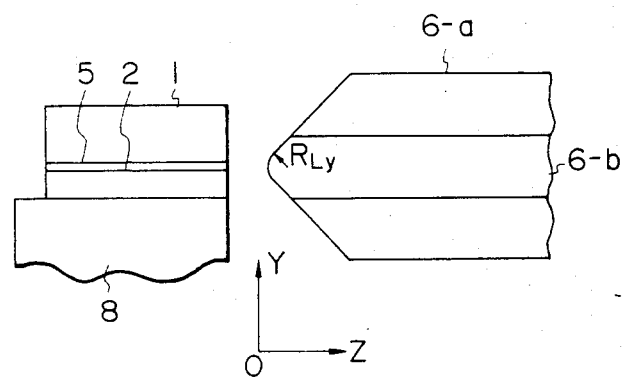
FIGS. 10A and 10B are longitudinal views of another embodiment of the present invention in the Y-Z and X-Z planes, respectively.
Figure 10B:
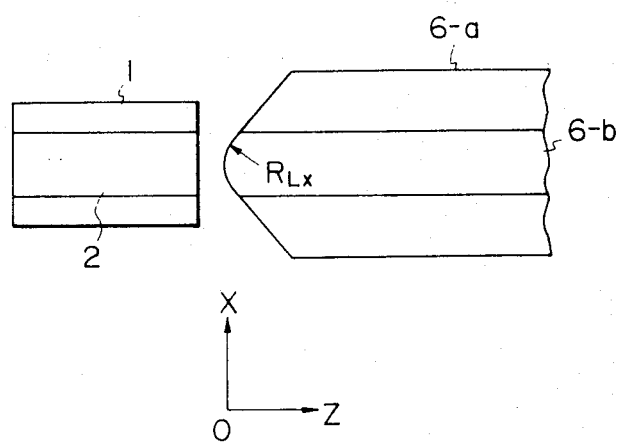

FIG. 10 illustrates another embodiment of the present invention for coupling the output light of the semiconductor laser with a fiber. This embodiment is intended to increase the coupling efficiency in the direction parallel to the junction plane of the semiconductor laser as well as in the direction perpendicular thereto. FIG. 10A is a section in a plane crossing the junction plane 5 of the semiconductor laser 1 at right angles thereto and passing through the fiber center axis, and FIG. 10B is a section in a plane parallel to the junction plane 5 of the semiconductor laser 1 and passing through the fiber center axis. That is, the light-receiving end portion of the fiber 6b is shaped to be hemi-ellipsoidal. Such a configuration can be achieved by polishing one end portion of the fiber 6b into a quadrangular pyramidal form first and then subjecting it to heat fusion or chemical etching.

Figure 11:
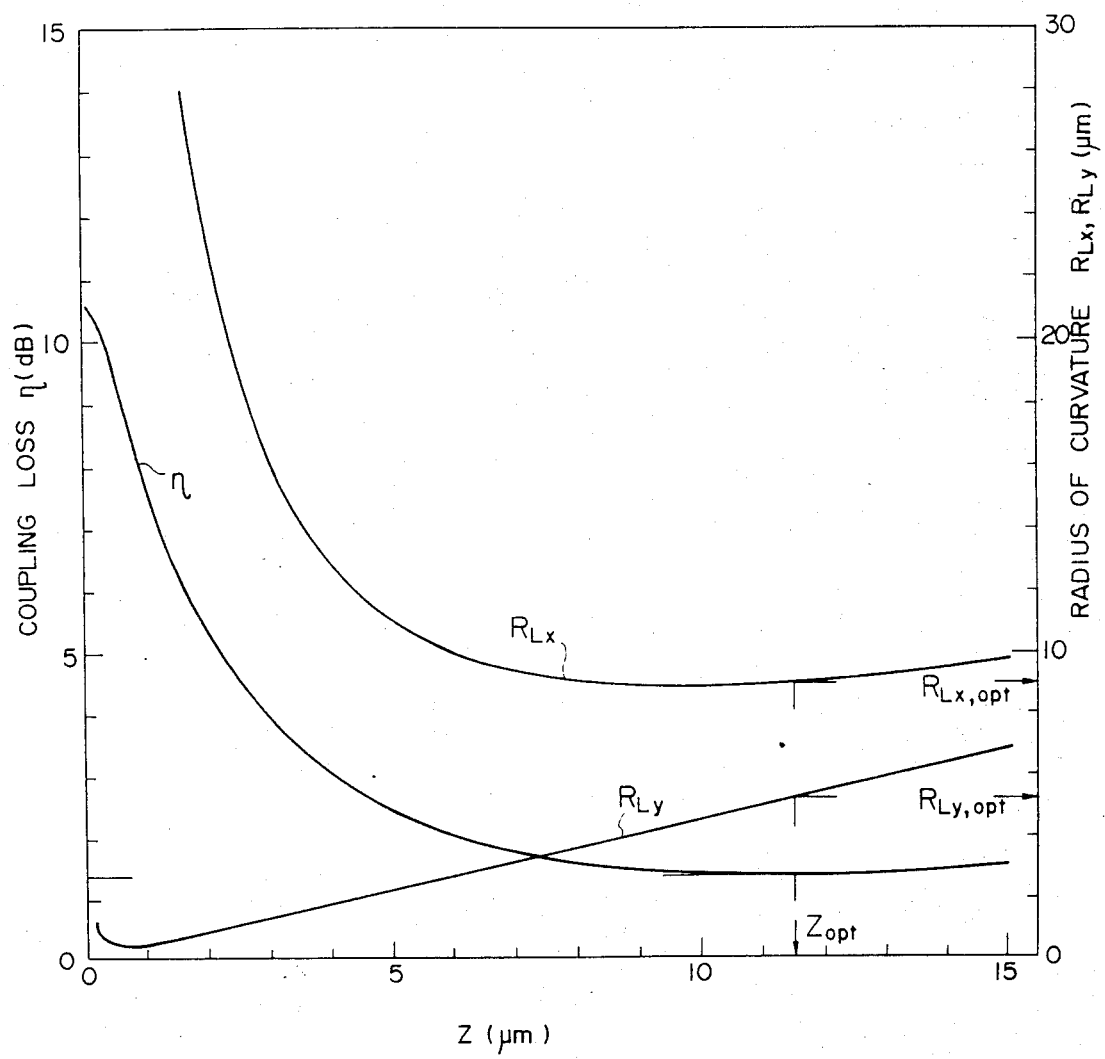
FIG. 11 is a graph showing the relationships between the radius of curvature of the lens portion and coupling loss in the embodiment of the present invention depicted in FIGS. 10A and 10B.

In FIGS. 10A and 10B, the radius of curvature of the light-receiving end portion of the fiber is $R_{Ly}$ in the Y-Z plane and $R_{Lx}$ in the X-Z plane, which are respectively given by the following equations (9) and (10):

$$R_{Ly} = (n'-1)R_y \quad (9)$$

$$R_{Lx} = (n'-1)R_x \quad (10)$$

where n' is the refractive index of the fiber core and $R_y$ and $R_x$ are given by the aforementioned equations (4) and (6). The coupling efficiency $\eta$ in this case is given by the following equation (11):

$$\eta = \frac{4}{\left(\frac{\omega_f}{\omega_x} + \frac{\omega_x}{\omega_f}\right)\left(\frac{\omega_f}{\omega_y} + \frac{\omega_y}{\omega_f}\right)} \quad (11)$$

where $\omega_f$ is the mode radius of the fiber and $\omega_x$ and $\omega_y$ are respectively given by the equations (7) and (8). In FIG. 11 there are shown the relationships of the radii of curvature $R_{Lx}$ and $R_{Ly}$ of the light-receiving end portion of the fiber and the coupling efficiency $\eta$ to the distance z between the semiconductor laser and the tip of the fiber, using the parameters of the semiconductor laser and the single mode fiber employed in the calculation for obtaining the characteristics of FIG. 9, that is, $\omega_{ox} = 2.04$ $\mu$m, $\omega_{oy} = 0.51$ $\mu$m, $\lambda = 1.32$ $\mu$m and $\omega_f = 6.56$ $\mu$m. Also in this example, the coupling efficiency is represented in terms of the coupling loss in dB. FIG. 11 indicates that there exists $z_{opt}$ which minimizes the coupling loss $\eta$ and that the radii of curvature $R_{Lx}$ and $R_{Ly}$ of the light-receiving end portion of the fiber in the X-Z and the Y-Z plane are determined in correspondence to the abovesaid $Z_{opt}$.

By this embodiment, since the hemi-ellipsoidal lens for matching use is formed as a unitary structure with the fiber itself, the problem of reliability of mechanical strength arising from the small diameter of the cylindrical lens is settled and there is no need of installing the cylindrical lens on the mount. Further, the axially symmetric lens 9 used in the prior art example of FIGS. 6A and 6B becomes unnecessary. Moreover, the unstableness of the operating characteristics of the semiconductor laser which is caused by the optical feedback to the semiconductor laser is improved because no discontinuity of the refractive index exists between the lens portion and the fiber. In addition, by this embodiment, the output light of the semiconductor laser having an arbitrary section of the active layer can be coupled to the fiber at high efficiency.

Figure 12A:
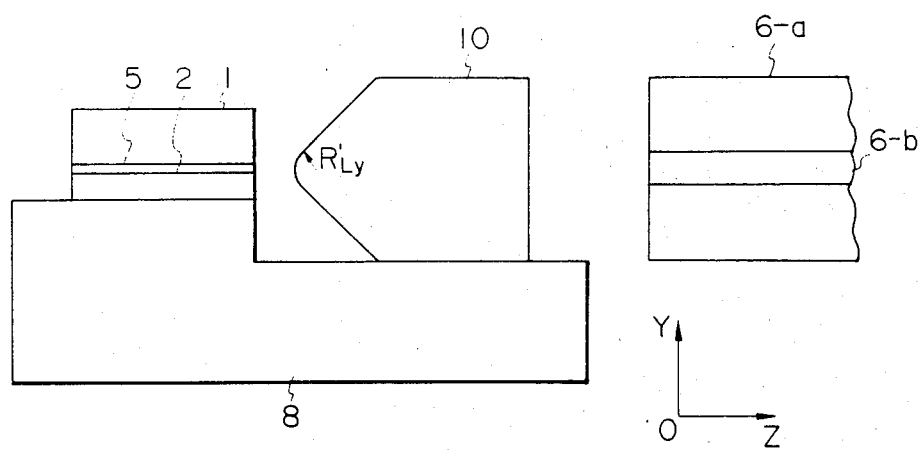
FIGS. 12A and 12B are longitudinal sectional views of another embodiment of the present invention in the Y-Z and X-Z planes, respectively.
Figure 12B:
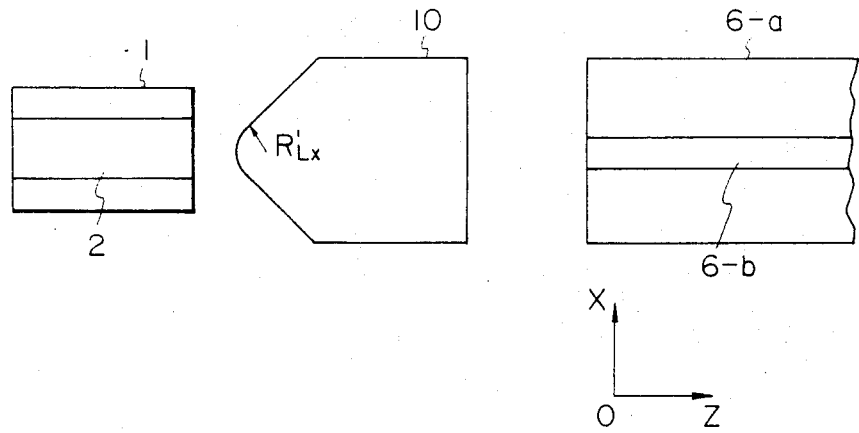

FIGS. 12A and 12B illustrate still another embodiment of the present invention, FIGS. 12A and 12B being sectional views in the Y-Z plane and the X-Z plane passing through the fiber center axis and perpendicular and parallel to the junction plane of the semiconductor laser, respectively. In FIGS. 12A and 12B, reference numeral 10 indicates an axially symmetric focusing lens, which is designed so that the radii of curvature of its one end portion on the side of the semiconductor laser are $R_{Ly}'$ and $R_{Lx}'$ in the Y-Z and the X-Z plane, respectively. Light emitted from the active layer 2 of the semiconductor laser 1 on the substrate 8 is converted by the hemi-ellipsoidal end portion of the focusing lens 10 into parallel beam in both of the X and Y directions and focused by the lens on the core 6b of the fiber 6a. In this case, the radii of curvature $R_{Ly}'$ and $R_{Lx}'$ of the light-receiving portion of the focusing lens 10 in the Y-Z and X-Z plane can be obtained by the same method as used for obtaining the radii of curvature of the light-receiving end portion of the fiber in FIG. 11. Namely, it is sufficient to design so that, immediately after passing through the hemi-ellipsoidal light-receiving end portion of the focusing lens 10, an elliptical light beam from the active layer 2 of the semiconductor laser 1 is converted into parallel beams having spot sizes $\omega_x$ and $\omega_y$ in the X- and Y-directions, respectively, then subjected to the axially symmetric lens action by the focusing lens 10 and converted again into parallel beams of the spot sizes $\omega x$ and $\omega_y$ on the light-receiving end face of the fiber 6a for incidence on the core 6b thereof. The focusing lens 10 can be obtained by polishing into a quadrangular pyramidal form one end portion of a fiber or lens formed an axially symmetric convex on another side or one end portion of a lens the refractive index of which has a square distribution, and then by subjecting the polished end portion to heat fusion or chemical etching.

In accordance with the present invention, the hemi-ellipsoidal lens for matching use is formed as a unitary structure with the focusing lens, by which is settled the problem of reliability of the mechanical strength resulting from the small diameter of the cylindrical lens, encountered in the prior art example of FIG. 6, and no cylindrical lens is required. Further, since the substrate having mounted thereon the semiconductor laser 1 and the focusing lens 10 and the fiber 6a can be spaced apart, the degree of freedom for packaging the semiconductor laser is increased.

Although the foregoing description has been given in connection with the case of coupling the semiconductor laser to a single mode fiber, but the same effect as described in the foregoing can be produced also in the coupling of a multi-mode fiber to the semiconductor laser. Further, also in a case of coupling a fiber to a thin film waveguide, the same effect as described above can be obtained except only the reversal of the direction of propagation of light.

As has been described above in detail, the present invention achieves a highly reliable coupling system which allows ease in coupling the semiconductor laser to the optical fiber and, in addition, the invention permits high-efficiency coupling which avoids unstable operation of the semiconductor laser which comes from optical feedback; accordingly, the present invention is of great utility from an industrial point of view.

What we claim is:

1. A coupling system for coupling the output light of an active layer of a semiconductor laser to a singlemode optical fiber characterized in that an end portion of the optical fiber to be coupled with the output light from the active layer of the semiconductor laser is formed into a quadrature pyramidal shape having a hemiellipsoidal tip so that, in two planes respectively parallel and perpendicular to the junction plane of the semiconductor laser, the width of said end portion continuously decreases towards said tip thereof to provide different radii of curvature at the tip such that the intensity distribution of transmitted light of the semiconductor laser and that of the optical fiber are effectively matched with each other in the two planes respectively parallel and perpendicular to the junction plane of the semiconductor laser independently of the optical fiber composition, whereby the efficiency of the coupling is optimized free of the composition of the optical fiber and the mode of the optical fiber.

* * * * *